(12) United States Patent
Komeda

(10) Patent No.: US 7,387,118 B2
(45) Date of Patent: Jun. 17, 2008

(54) WIRE SAW

(75) Inventor: Tatsuya Komeda, Nara-ken (JP)

(73) Assignee: Takatori Corporation, Nara-ken (JP)

( * ) Notice: Subject to any disclaimer, the term of this patent is extended or adjusted under 35 U.S.C. 154(b) by 164 days.

(21) Appl. No.: 11/637,119

(22) Filed: Dec. 12, 2006

(65) Prior Publication Data

US 2007/0131214 A1 Jun. 14, 2007

(30) Foreign Application Priority Data

Dec. 13, 2005 (JP) .............................. 2005-359372

(51) Int. Cl.
*B28D 1/06* (2006.01)
(52) U.S. Cl. ..................... 125/16.02; 451/310; 451/311; 451/304
(58) Field of Classification Search .............. 125/16.01, 125/16.02, 21; 451/296, 304, 310, 311; 83/651.1
See application file for complete search history.

(56) References Cited

U.S. PATENT DOCUMENTS 6,024,080 A * 2/2000 Hodsden ...................... 125/21
6,095,129 A * 8/2000 Kanemichi et al. ........ 125/16.02
6,279,564 B1 * 8/2001 Hodsden et al. ............... 125/21

* cited by examiner

*Primary Examiner*—Jacob K. Ackun, Jr.
(74) *Attorney, Agent, or Firm*—Wenderoth, Lind & Ponack, L.L.P.

(57) ABSTRACT

The invention provides a wire saw in which wire tension fluctuations occurring in swinging of a row of wires can be accommodated to thereby increase a velocity of the wire and to carry out cutting with efficiency and precision by utilizing swinging of the row of wires even with thin wire. In the wire saw having the row of wires formed by winding the wire about a plurality of work rollers provided to a swinging disk many times, for pushing a workpiece against the row of wires caused to reciprocate or travel in one direction at high velocity to cut the workpiece into a plurality of pieces, and for swinging the row of wires in cutting of the workpiece, a feed side pulley for guiding feed side wire going into the work rollers to the work rollers and a retrieving side pulley for guiding retrieving side wire going out of the work rollers to an outside are disposed coaxially on an axial center of rotation of the swinging disk so that the tension fluctuations do not occur in the wire even if the row of wires swings.

1 Claim, 7 Drawing Sheets

(a)

(b)

(c)

(a)

(b)

(c)

(a)

(b)

(c)

(a)

(b)

(c)

WIRE SAW

BACKGROUND OF THE INVENTION

1. Field of the Invention

The present invention relates to a wire saw having improved cutting efficiency and accuracy by swing row of wires in pushing a workpiece against the row of wires reciprocating or traveling in one direction at high speed to cut the workpiece and more particularly to a wire saw in which occurrence of tension fluctuations in wires at a time of swinging of the row of wires is prevented to prevent occurrence of cuts of the wire to obtain stable traveling performance.

2. Description of the Related Art

Conventionally, in a wire saw in which a row of wires are swung in cutting a workpiece, as shown in FIG. 9, wire A drawn out from a feed side reel 1 is led via a feed side traverser 3 driven by a motor 2 and a plurality of guide pulleys 4 to a tension mechanism 7 formed of an encoder 5 and a tension arm 6, a load cell 8 for measuring tension in the wire A, and a plurality of guide pulleys 9 and then wound around three work rollers 11 mounted to a swinging disk 10 many times to form a row of wires. Then, the wire A passes through a plurality of guide pulleys 12, a load cell 13 for measuring tension of the wire A, a tension mechanism 16 formed of an encoder 14 and a tension arm 15, a plurality of guide pulleys 17, and a retrieving side traverser 19 driven by a motor 18 and is taken up by a retrieving side reel 20.

Each of the work rollers 11 is formed in its outer periphery with grooves and a workpiece fixing table 21 is disposed to be properly moved up and down by driving means (not shown) right above an upper row of wires wound by utilizing the grooves around an outer periphery between the work rollers 11 to thereby push down a workpiece B mounted to a lower face of the workpiece fixing table 21 toward the row of wires.

As the above-described wire saw, there are a loose abrasive grain wire saw in which slurry liquid including hard abrasive grains such as SiC, diamond, and the like is supplied to a vicinity of a workpiece cutting position of the row of wires by a nozzle 22 and a fixed abrasive grain wire saw for cutting by using the wire A to which diamond grains are fixed through resin or the like and while supplying coolant to the workpiece cutting position of the row of wires.

The vertical swinging disk 10 mounted with the work rollers 11 are rotatably supported on a machine base 23 through a cross roller bearing 24 and is rotated in a reciprocating manner through a constant angle at a time of cutting of the workpiece and is fully rotated at a time of winding of the wire about the work rollers by a driving motor 25 through a pulley and a belt provided to a rear end.

A swinging mechanism of the row of wires swings the row of wires in a reciprocating manner through a constant angle at a time of cutting of the workpiece by rotating the swinging disk mounted with the work rollers in a reciprocating manner by using the different motor 25 from a spindle for driving the work rollers for rotation. In the mechanism, the wire A comes in contact with the workpiece B in an arc shape to thereby reduce contact resistance to improve bringing in of the slurry liquid to enhance cutting performance.

Conventionally, to guide the wire A to the work rollers 11 of the above-described kind of wire saw, the feed side guide pulleys 9 for guiding the feed side wire going into the work rollers 11 to the work rollers 11 and the retrieving side guide pulleys 12 for guiding the retrieving side wire going out of the work rollers 11 to an outside are fixed and disposed in positions outside and isolated from an axial center of rotation of the swinging disk 10 (see Japanese Examined Patent Publication No. 6-35107, for example)

In a structure in which the feed side guide pulleys 9 and the retrieving side guide pulleys 12 are fixed and disposed in the positions outside and isolated from the axial center of rotation of the swinging disk 10 with respect to the work rollers 11, distances between the work rollers 11 and the feed side guide pulleys 9 and the retrieving side guide pulleys 12 fluctuate in swinging of the row of wires and therefore the wire A is pulled or loosened.

Moreover, in recent cutting of a silicon ingot or the like, there are tendencies to reduce a thickness of a wafer to increase the number of wafers obtained from a work ingot and to reduce a diameter of the wire A to minimize cutting loss from a viewpoint of reduction in manufacturing cost. Therefore, challenges in the wire saw are to reduce the diameter of the wire A and to increase a linear velocity of the wire A from a viewpoint of improvement in manufacturing efficiency.

However, in the swinging mechanism in the above-described prior-art wire saw, fluctuations in the wire tension are large in swinging of the row of wires. If the wire diameter is reduced, a load on the wire increases in swinging and the wire may be cut in some cases.

Moreover, in increasing the linear velocity of the wire, the wire may be broken in the swinging in some cases similarly to the above case.

Furthermore, in a wire saw in which work rollers are directly driven in normal and reverse directions to cause wire to reciprocate at high velocity, it is conceivable that rotation of a wire reel is caused to follow tension fluctuations in the wire by a driving motor for the wire reel. However, such a method requires a high-precision driving motor, which results in high cost.

In the fixed abrasive grain wire saw, there is a tendency to increase a swinging angle so as to enhance the cutting performance, which results in large tension fluctuations in the wire at the time of swinging.

SUMMARY OF THE INVENTION

Therefore, to solve the above problems, it is an object of the present invention to provide a wire saw in which wire tension fluctuations occurring in swinging of a row of wires can be accommodated by a low-cost mechanical structure to thereby increase a velocity of the wire and to carry out cutting with efficiency and precision by utilizing swinging of the row of wires even with thin wire.

To achieve the above object, according to an invention of claim 1, there is provided a wire saw having a row of wires formed by winding wire about a plurality of work rollers provided to a swinging disk many times, for causing the wires of the row of wires to reciprocate or travel in one direction at high velocity, for pushing a workpiece against the row of wires to cut the workpiece into a plurality of pieces, and for swinging the row of wires in cutting of the workpiece, wherein a feed side pulley for guiding feed side wire going into the work rollers to the work rollers and a retrieving side pulley for guiding retrieving side wire going out of the work rollers to an outside are disposed coaxially on an axial center of rotation of the swinging disk.

If the feed side pulley and the retrieving side pulley are disposed coaxially on the axial center of rotation of the swinging disk as described above, fluctuations do not occur in distances between the work roller and the feed side pulley and the retrieving side pulley even when the work rollers swing. Therefore, even if the row of wires is swung, wire tension fluctuations do not occur. The number of work rollers provided to the swinging disk is not limited to three but may be two, for example.

According to an invention, there is provided a wire saw having a row of wires formed by winding wire about a plurality of work rollers provided to a swinging disk many times, for causing the wires of the row of wires to reciprocate or travel in one direction at high velocity, for pushing a workpiece against the row of wires to cut the workpiece into a plurality of pieces, and for swinging the row of wires in cutting of the workpiece, wherein a feed side pulley located on a side of feeding of the wire to the work rollers and a retrieving side pulley located on a side of retrieving of the wire from the work rollers are provided to the swinging disk so as to swing together with the swinging disk, two outer pulleys for guiding the wire to the feed side pulley and for guiding the wire from the feed side pulley to the work rollers are fixed and disposed on an outer side of the feed side pulley, two outer pulleys for guiding the retrieved wire from the work rollers to the retrieving side pulley and for guiding the wire from the retrieving side pulley to an outside are fixed and disposed on an outer side of the retrieving side pulley, and the feed side pulley and the retrieving side pulley are located with respect to each other so that respective distances between the feed side pulley and the retrieving side pulley and the respective corresponding outer pulleys increase and decrease in directions for canceling out tension fluctuations in the wire according to the tension fluctuations in the wire due to increase and decrease of the distances between the work rollers and the outer pulleys in swinging of the swinging disk.

If the feed side pulley and the retrieving side pulley are provided so as to swing together with the swinging disk and the respective corresponding outer pulleys are fixed and disposed on the outer sides of the feed side pulley and the retrieving side pulley, the distances between the work roller and the fixed outer pulleys increase and decrease in swinging of the work rollers and the wire tension fluctuates. However, if the pulleys are located in such relative positions that the feed side pulley and the retrieving side pulley provided to the swinging disk also move similarly and that distances between the feed side and retrieving side pulleys and the outer pulleys change so as to cancel out the tension fluctuations in the wire, it is possible to accommodate the tension fluctuations occurring in the wire at the time of swinging. The number of work rollers provided to the swinging disk is not limited to three but may be two, for example.

According to an invention, there is provided a wire saw having a row of wires formed by winding wire about a plurality of work rollers provided to a swinging disk many times, for causing the wires of the row of wires to reciprocate or travel in one direction at high velocity, for pushing a workpiece against the row of wires to cut the workpiece into a plurality of pieces, and for swinging the row of wires in cutting of the workpiece, wherein a feed side pulley in a feed side position where the wire goes into to the work rollers and for guiding the feed side wire to the work rollers and a retrieving side pulley in a retrieving side position where the wire goes out of the work rollers and for guiding the retrieving side wire to an outside are provided on outer sides of the swinging disk so as to be movable in a tension applying direction and a tension lessening direction of the wire, the pulley on a side where the tension in the wire decreases in swinging of the swinging disk is controlled in the tension applying direction, and the pulley on the side where the tension in the wire increases in swinging of the swinging disk is controlled in the tension lessening direction.

If the pulley on the side where the tension in the wire decreases in swinging of the swinging disk is controlled in the tension applying direction and the pulley on the side where the tension in the wire increases in swinging of the swinging disk is controlled in the tension lessening direction out of the feed side pulley and the retrieving side pulley as described above, it is possible to accommodate the wire tension fluctuations occurring at the time of swinging of the row of wires. The number of work rollers provided to the swinging disk is not limited to three but may be two, for example.

According to an invention, there is provided a wire saw having a row of wires formed by winding wire about three work rollers provided to a swinging disk many times, for causing the wires of the row of wires to reciprocate or travel in one direction at high velocity, for pushing a workpiece against the row of wires to cut the workpiece into a plurality of pieces, and for swinging the row of wires in cutting of the workpiece, wherein the work roller through which the wire goes into and out of the swinging disk is disposed so that a wire contact point of the work roller is aligned with an axial center of rotation of the swinging disk.

If the wire contact point of the one work roller is aligned with the axial center of rotation of the swinging disk, the work rollers swing about the wire contact point of the work roller as a fulcrum and the wire tension fluctuations do not occur even when the row of wires swing.

Here, the swinging disk is rotated in a reciprocating manner through a constant angle by a different driving source from one for the work rollers in cutting of the workpiece to swing the work rollers and is fully rotated in winding the wire around the work rollers.

According to the invention of claim 1, because the wire goes into and out of the work roller at the center of swinging, deflections of the wire due to swinging do not occur and the tension fluctuations do not occur even when swinging is carried out. Therefore, control of the wire becomes stable and the workpiece cutting precision is enhanced.

Moreover, because the tension fluctuations in the wire are small in spite of use of the swinging mechanism, it is possible to make the wire thinner and to cause the wire to travel at higher velocity.

According to the invention, because the feed side pulley and the retrieving side pulley move in synchronization with positional changes of the work rollers due to swinging of the row of wires, it is possible to lessen the tension fluctuations in the wire, control of the wire becomes stable, and the workpiece cutting precision is enhanced.

Moreover, because the tension fluctuations in the wire are small in spite of use of the swinging mechanism, it is possible to make the wire thinner and to cause the wire to travel at higher velocity.

According to the invention, because movements of the feed side pulley and the retrieving side pulley are controlled in the tension increasing/decreasing directions to adapt to the tension fluctuations at the time of swinging of the row of wires, it is possible to lessen the tension fluctuations in the wire even when swinging is carried out, control of the wire becomes stable, and the workpiece cutting precision is enhanced.

Moreover, because the tension fluctuations in the wire are small in spite of use of the swinging mechanism, it is possible to make the wire thinner and to cause the wire to travel at higher velocity.

According to the invention, because a starting point of swinging of the wire going into and out of the row of wires is aligned with the center of swinging, it is possible to lessen the tension fluctuations in the wire even when swinging is carried out, control of the wire becomes stable, and the workpiece cutting precision is enhanced.

Moreover, because the tension fluctuations in the wire are small in spite of use of the swinging mechanism, it is possible to make the wire thinner and to cause the wire to travel at higher velocity.

Furthermore, in any of the inventions, because it is possible to accommodate the tension fluctuations in the wire at the time of swinging of the row of wires, it becomes unnecessary to take the tension fluctuations due to swinging motion into consideration for torque of the motor for driving the wire. Therefore, it is possible to reduce cost of the wire reel driving motor and to prevent occurrence of the cut of the wire and it is possible to make the wire thinner and to increase the velocity of the wire.

DETAILED DESCRIPTION OF THE PREFERRED EMBODIMENTS

Figure 9:
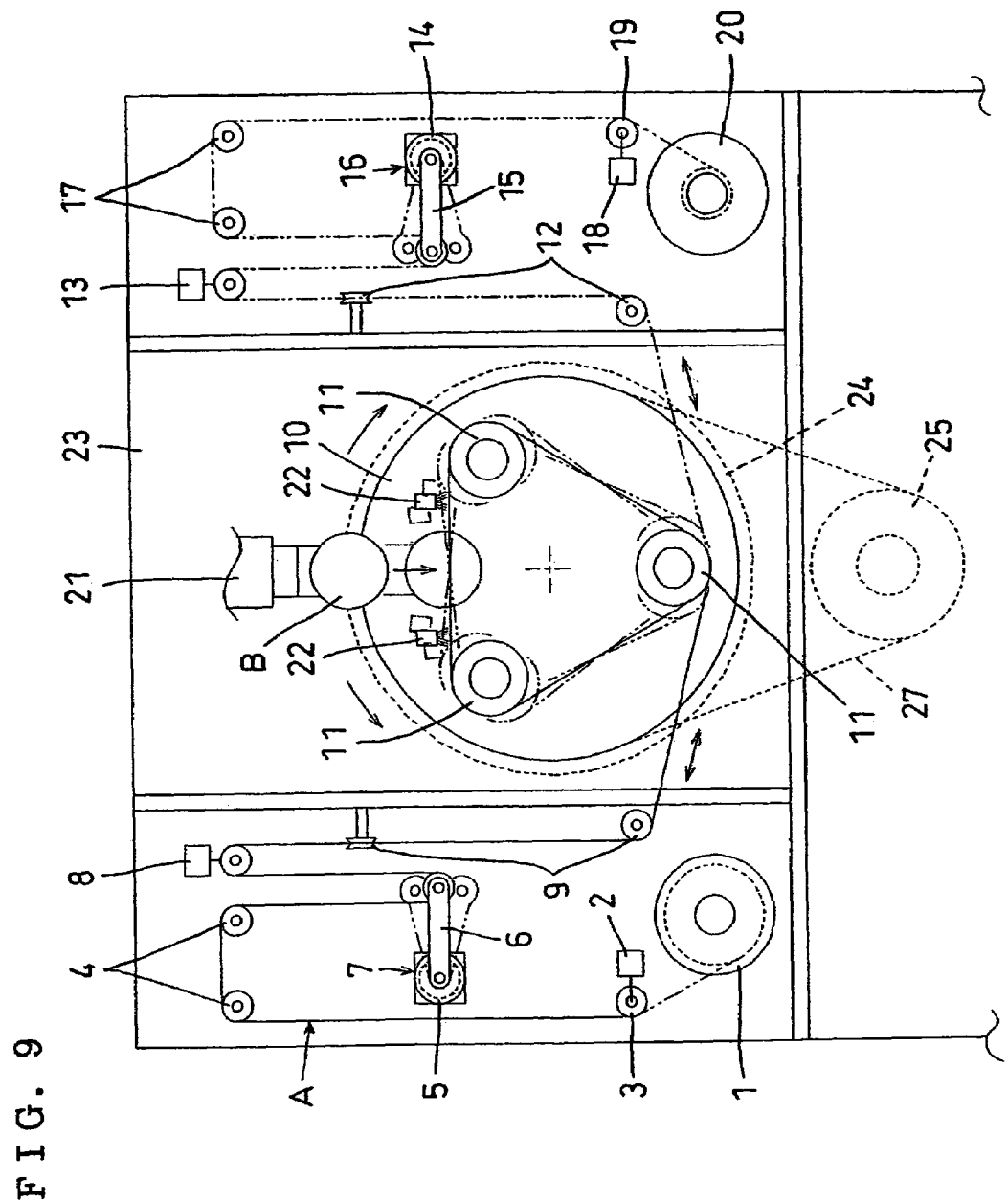
FIG. 9 is a front view of a basic structure and showing a prior-art wire saw.

Embodiments of the present invention will be described below based on examples shown in the drawings. A basic and general structure of a wire saw is as shown in FIG. 9 and portions similar to those in FIG. 9 are provided with similar reference numerals to explain them.

Figure 1:
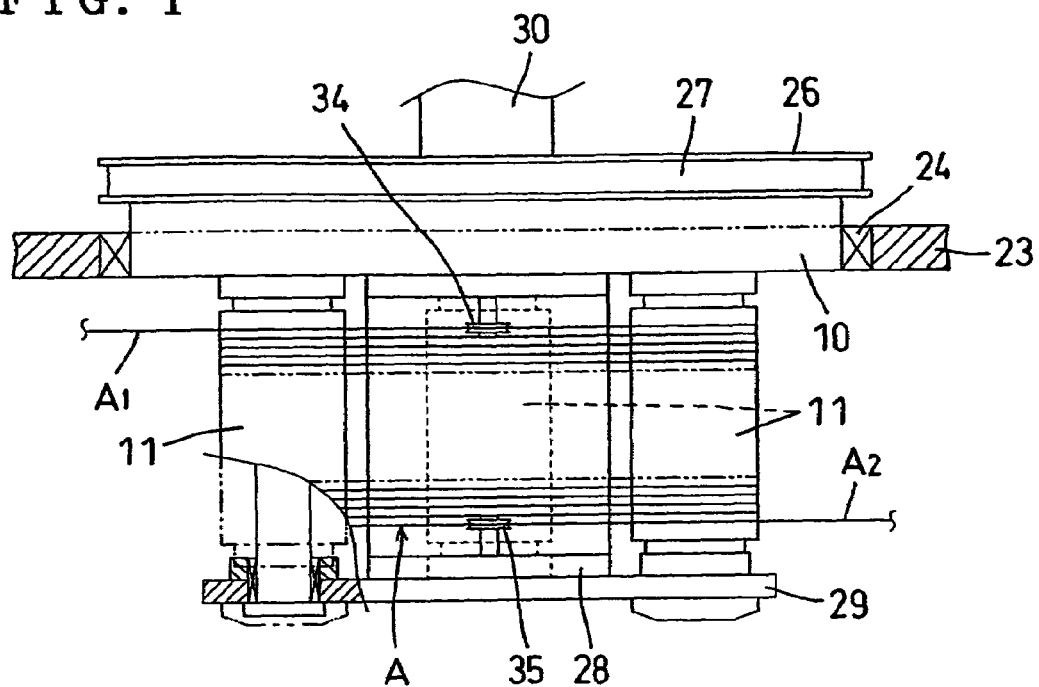
FIG. 1 is a cross-sectional plan view of an essential portion and showing a wire saw of a first embodiment.
Figure 2:
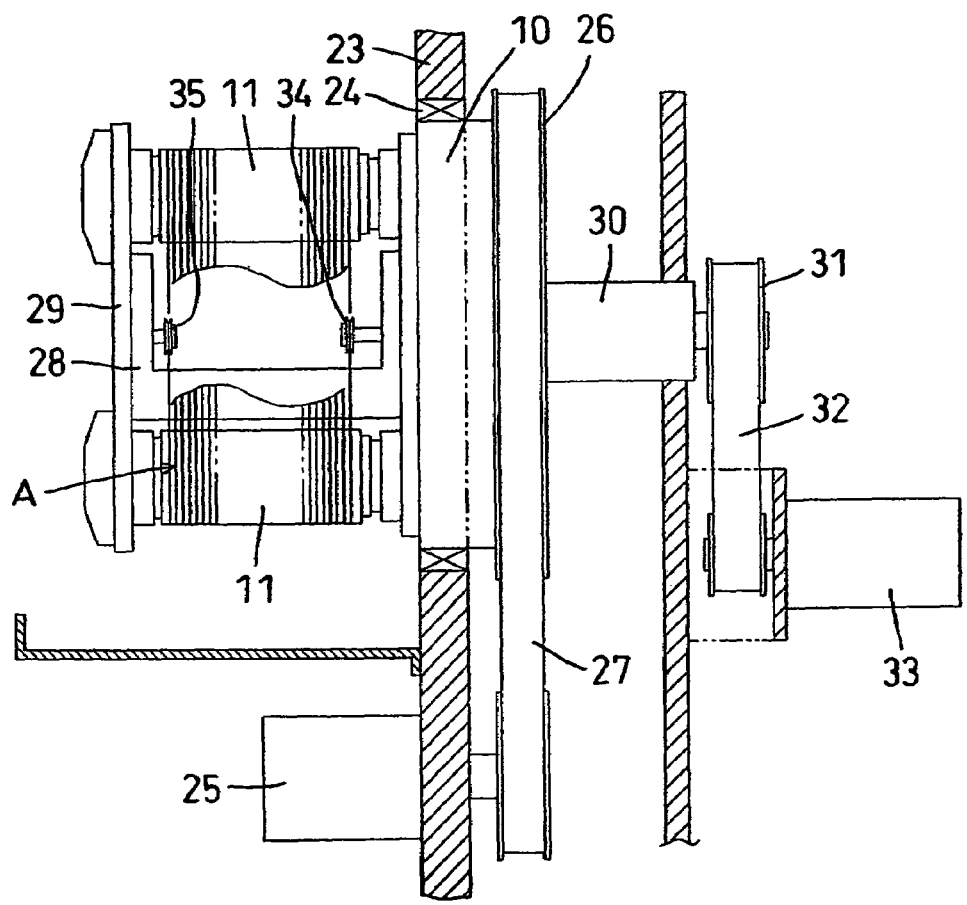
FIG. 2 is a vertical sectional side view of the essential portion and showing the wire saw of the first embodiment.
Figure 3:
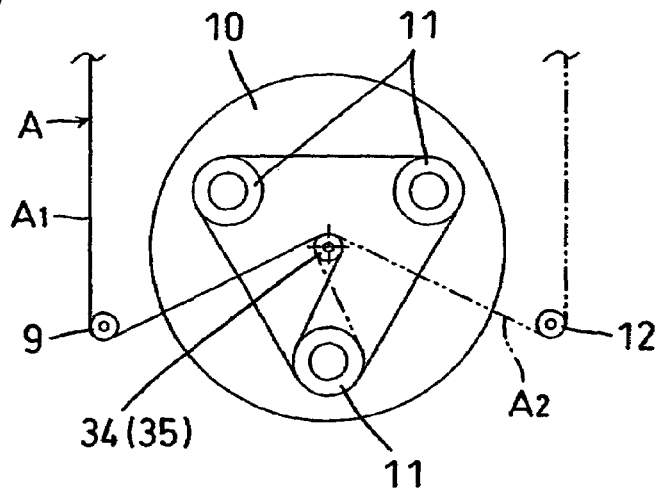
FIGS. 3A to 3C are actuation explanatory views of the essential portion and showing the wire saw of the first embodiment.
Figure 3:
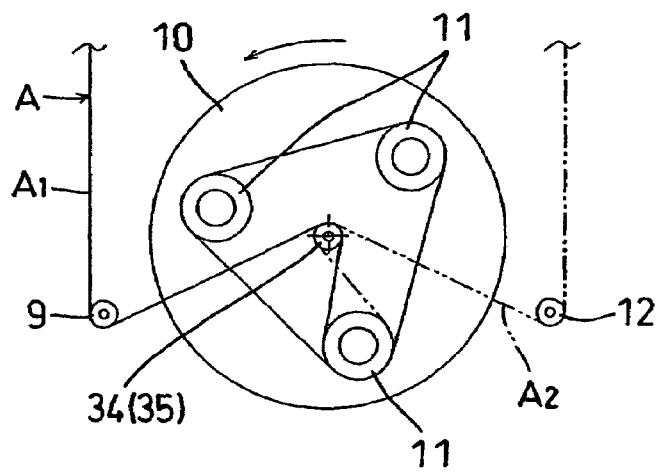
Figure 3:
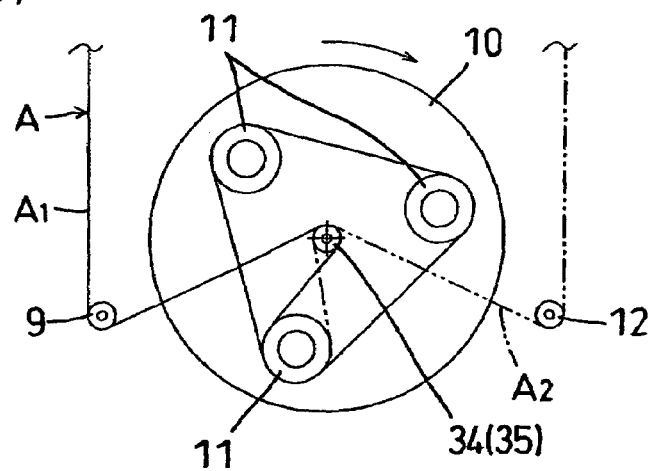

As shown in FIGS. 1 and 2, a vertical swinging disk 10 mounted with three work rollers 11 is rotatably supported on a machine base 23 through a cross roller bearing 24 and is rotated in a reciprocating manner through a constant angle at a time of cutting of a workpiece and is fully rotated at a time of winding of wire A about the work rollers 11 by a driving motor 25 through a pulley 26 and a belt 27 provided to a rear end.

Rear end sides of the work rollers 11 are supported on the swinging disk 10 so that they are disposed horizontally and at equal intervals on a front face of the swinging disk 10 and tip end sides of the work rollers 11 are supported by a tip end support plate 29 of a fixing frame 28 provided to the front face of the swinging disk 10.

The three work rollers 11 are interlocked with a spindle driving shaft 30 at a rear center through a proper mechanism (not shown) mounted in the swinging disk 10 and are rotated in the reciprocating manner and fully rotated by a spindle shaft driving motor 33 through a pulley 31 and a belt 32.

FIGS. 1 to 3C show a first embodiment of the invention. A feed side pulley 34 for guiding feed side wire $A_1$ going into the work rollers 11 to the work rollers 11 and a retrieving side pulley 35 for guiding retrieving side wire $A_2$ going out of the work rollers 11 to an outside are disposed coaxially on an axial center of rotation of the swinging disk 10.

The feed side pulley 34 and the retrieving side pulley 35 are mounted to opposed faces of the fixed frame 28 so as to be coaxial with each other on the axial center of rotation of the swinging disk 10.

FIGS. 3A to 3C show a state of actuation of the first embodiment. As shown in FIG. 3A, the feed side wire $A_1$ passes from an outside fixed guide pulley 9 to the feed side pulley 34 and enters the work roller 11 positioned in a lower position and the retrieving side wire $A_2$ is drawn out from the work roller 11 in the lower position through the retrieving side pulley 35 and an outside fixed guide pulley 12 when a workpiece cutting portion located above the row of wires is horizontal.

When the swinging disk 10 is turned leftward and rightward through a constant angle in cutting of the workpiece, the workpiece cutting portion positioned above the row of wires swings as shown in FIGS. 3B and 3C. In this swinging, because the wire A goes into and out of the work roller 11 through a center of swinging, distances between the work roller 11 and the feed side pulley 34 and the retrieving side pulley 35 do not fluctuate. Therefore, the tension in the wire A does not fluctuate due to swinging, control of the wire A becomes stable, and cutting accuracy of the workpiece B is enhanced.

The first embodiment can be applied also to a wire saw using two work rollers.

Figure 4:
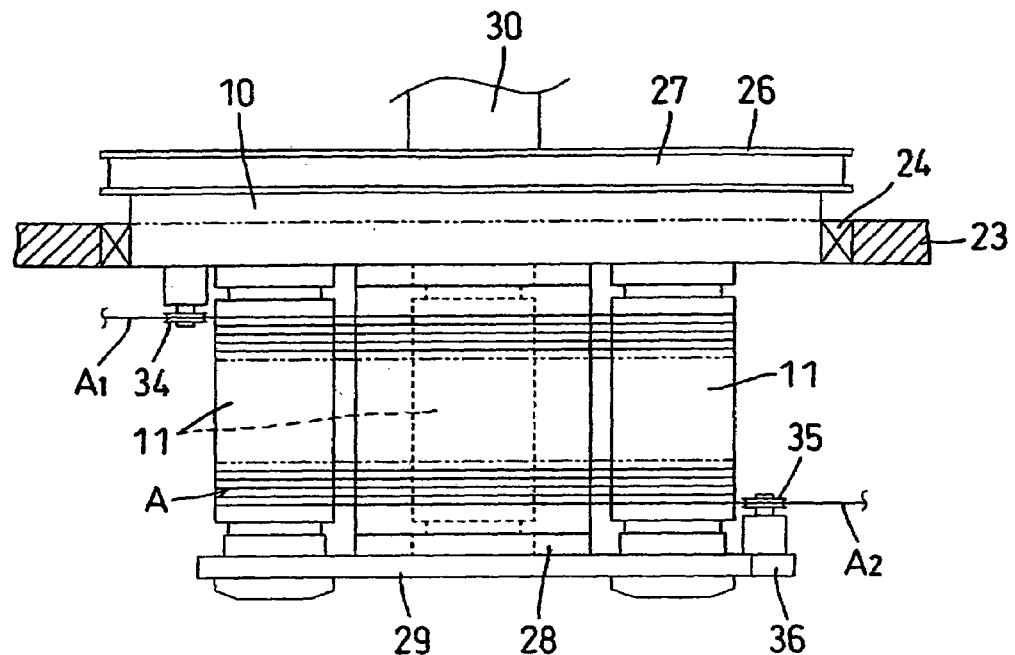
FIG. 4 is a cross-sectional plan view of an essential portion and showing a wire saw of a second embodiment.
Figure 5:
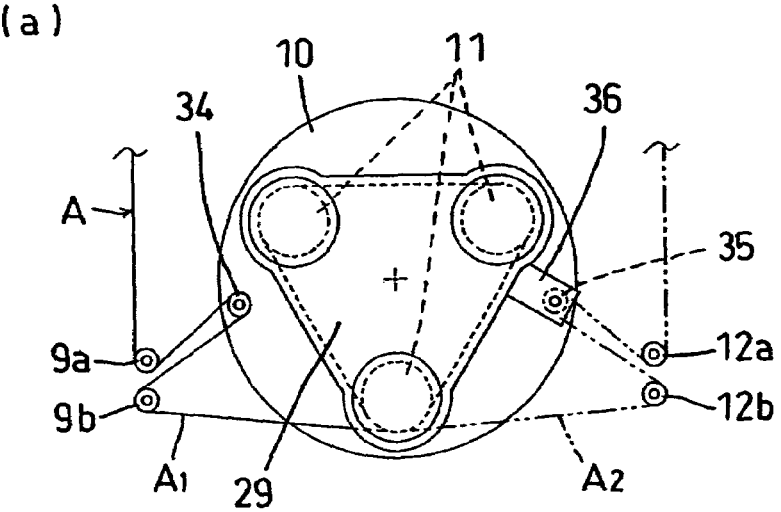
FIGS. 5A to 5C are actuation explanatory views of the essential portion and showing the wire saw of the second embodiment.
Figure 5:
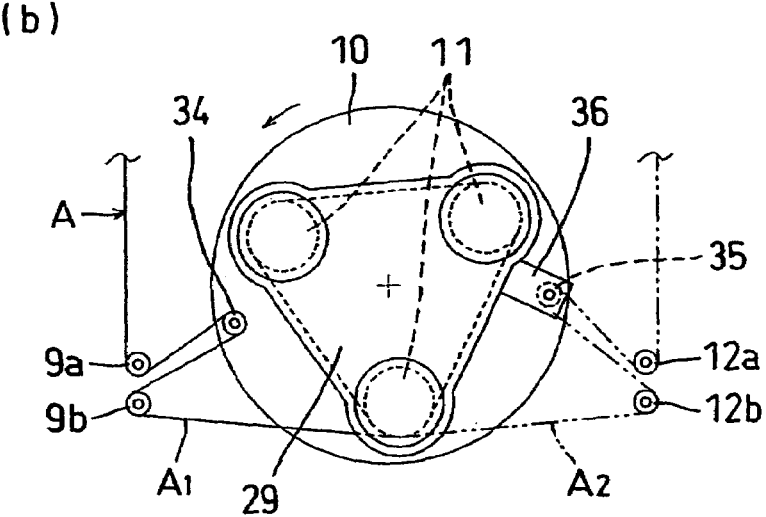
Figure 5:
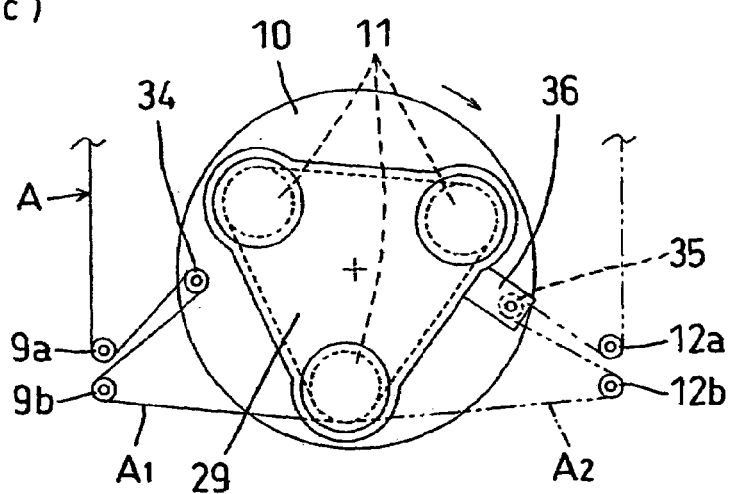

FIGS. 4 to 5C show a second embodiment of the invention. A feed side pulley 34 on a feed side of wire A to work rollers 11 and a retrieving side pulley 35 on a retrieving side of the wire A from the work rollers 11 are provided in such a manner as to turn together with the swinging disk 10. On an outer side of the feed side pulley 34, an outer pulley 9a for guiding feed side wire $A_1$ to the feed side pulley 34 and an outer pulley 9b for guiding the wire $A_1$ from the feed side pulley 34 to the work rollers 11 are fixed and disposed, respectively. On an outer side of the retrieving side pulley 35, an outer pulley 12b for guiding retrieving side wire $A_2$ from the work rollers 11 to the retrieving side pulley 35 and an outer pulley 12a for guiding the wire $A_2$ from the retrieving side pulley 35 to an outside are fixed and disposed, respectively.

The feed side pulley 34 is mounted to an outer peripheral portion of the swinging disk 10 and in a position below the row of wires positioned in an upper position, the retrieving side pulley 35 is mounted to a tip end portion of a pulley fixing frame 36 protruding from a tip end support plate 29, and the feed side pulley 34 and the retrieving side pulley 35 turn together with the swinging disk 10, respectively.

FIGS. 5A to 5C show a state of actuation of the second embodiment. As shown in FIG. 5A, when a workpiece cutting portion located above the row of wires is horizontal, the feed side wire $A_1$ passes from an outside fixed side outer pulley 9a to the feed side pulley 34 on the swinging disk 10 and enters the work roller 11 positioned in a lower position through the fixed side outer pulley 9b again. The retrieving side wire $A_2$ passes from the work roller 11 in the lower position through the fixed side outer pulley 12b and the retrieving side pulley 35 on the swinging disk 10 and is drawn out from the fixed side outer pulley 12a again.

When the swinging disk 10 is turned leftward and rightward through a constant angle in cutting of the workpiece, the workpiece cutting portion positioned above the row of wires swing as shown in FIGS. 5B and 5C. In this swinging, because the feed side pulley 34 and the retrieving side pulley 35 turn in the swinging direction in synchronization with swinging of the row of wires, positional relationships between the work rollers 11, the feed side pulley 34, and the retrieving side pulley 35 do not change. On the feed side, when one of a space between the work roller 11 and the outer pulley 9b and spaces between the feed side pulley 34 and the outer pulleys 9a and 9b widens, the other narrows to thereby accommodate the tension fluctuations in the feed side wire $A_1$. On the retrieving side, when one of a space between the work roller 11 and the outer pulley 12b and spaces between the retrieving side pulley 35 and the outer pulleys 12a, 12b widens, the other narrows to thereby accommodate the tension fluctuations in the retrieving side wire $A_2$. In this way, it is possible to lessen the tension fluctuations in the wire A even if swinging is carried out, control of the wire becomes stable, and the workpiece cutting accuracy is enhanced.

In the second embodiment, the outer pulleys 9a, 9b are disposed between the work roller 11 and the feed side pulley 34 and close to the feed side pulley 34 when seen from the center of the swinging disk 10. The outer pulleys 12a, 12b are disposed in such positions that the outer pulleys 9a, 9b and the outer pulleys 12a, 12b are symmetric. Changes in the distance between the work roller 11 and the outer pulley 9b due to swinging motion of the swinging disk 10 is cancelled out by changes in a distance of reciprocation between the feed side pulley 34 and the outer pulleys 9a, 9b and the changes in the tension due to swinging do not affect an outer side (feed side of the wire) of the outer pulley 9a. Also on the retrieving side of the wire, the changes in the tension due to swinging do not affect an outer side (retrieving side of the wire) of the outer pulley 12a by the similar action.

Incidentally, positions of the feed side pulley 34, the retrieving side pulley 35, and the respective outer pulleys 9a, 9b, 12a, and 12b in the second embodiment are not limited to those in a structure shown in the drawings. In short, such positional relationships that the fluctuations of the distances between the work roller 11 on the swinging disk 10 side and the fixed side outer pulleys 9b, 12b can be cancelled out by the fluctuations of the distances between the feed side pulley 34 and the retrieving side pulley 35 on the swinging disk 10 side and the fixed side corresponding outer pulleys 9a, 9b, 12a, and 12b may be sufficient. These can be obtained in advance by means of calculation at a time of designing.

Figure 6:
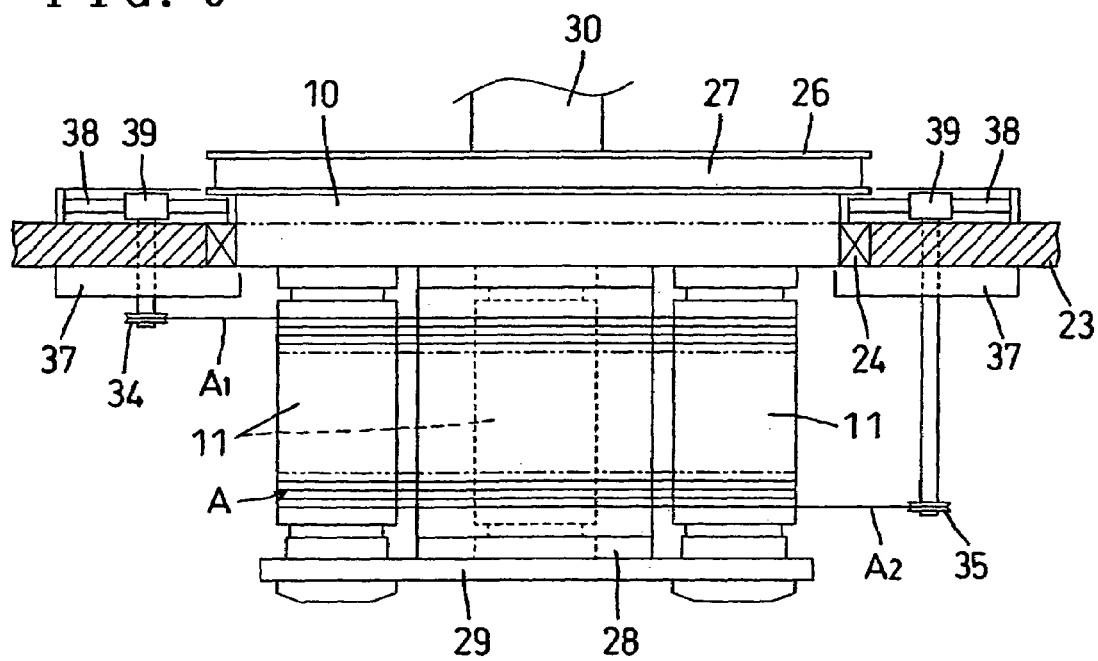
FIG. 6 is a cross-sectional plan view of an essential portion and showing a wire saw of a third embodiment.
Figure 7:
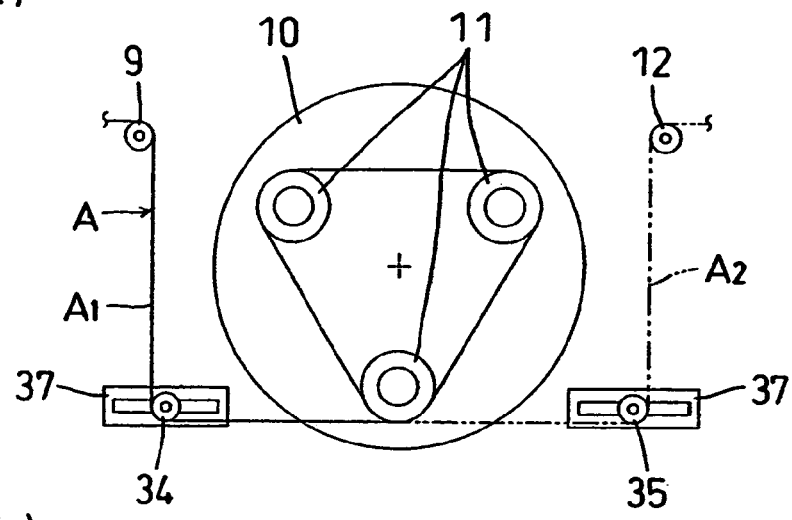
FIGS. 7A to 7C are actuation explanatory views of the essential portion and showing the wire saw of the third embodiment.
Figure 7:
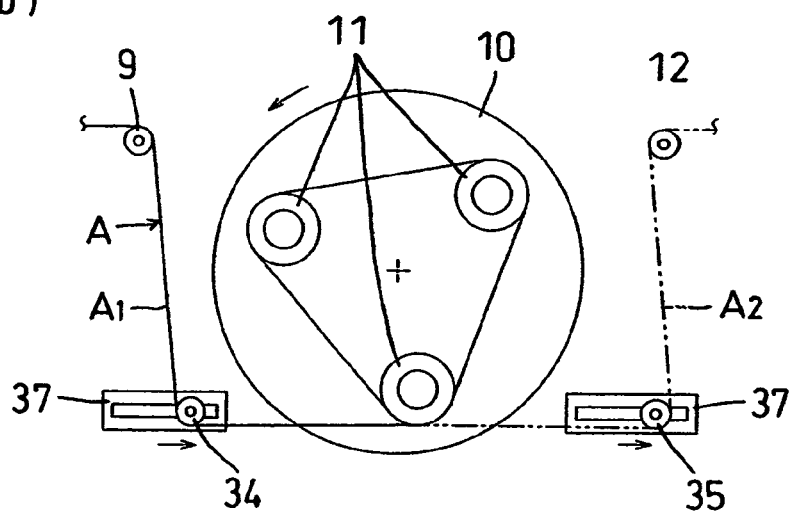
Figure 7:
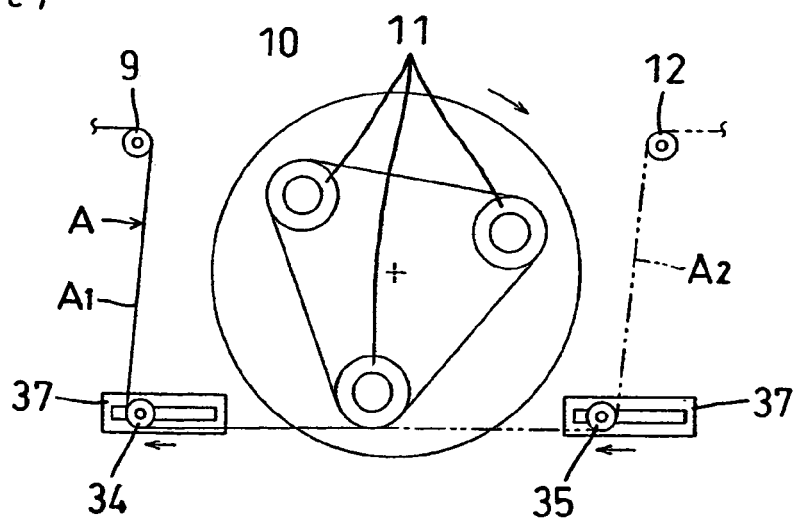

FIGS. 6 to 7C show a third embodiment of the invention. On outer sides of the swinging disk 10, a feed side pulley 34 for guiding feed side wire $A_1$ to the work rollers 11 is provided in a position on a feed side where wire A goes into the work rollers 11 and a retrieving side pulley 35 for guiding retrieving side wire $A_2$ to an outside is provided in a position on a retrieving side where the wire A goes out of the work rollers 11 so that the pulleys 34, 35 can move in a tension applying direction and a tension lessening direction of the wire A. In turning of the swinging disk 10 in a reciprocating manner, the pulley on the side where the tension in the wire A reduces is controlled in the tension applying direction and the pulley on the side where the tension in the wire A increases is controlled in the tension lessening direction.

As shown in FIG. 6, the feed side pulley 34 and the retrieving side pulley 35 are supported to be able to move horizontally by rails 38 and sliders 39 of guide frames 37 fixed to the machine base 23 and movements of the pulleys are controlled by cylinders or the like actuated for expansion and contraction in response to the tension fluctuations.

FIGS. 7A to 7C show a state of actuation of the third embodiment. As shown in FIG. 7A, when a workpiece cutting portion located above the row of wires is horizontal, feed side wire $A_1$ passes through the feed side pulley 34 and enters the work roller 11 located in a lower position, retrieving side wire $A_2$ is drawn out from the work roller 11 in the lower position through the retrieving side pulley 35, and the feed side pulley 34 and the retrieving side pulley 35 are located in middle positions of the guide frames 37, respectively.

When the swinging disk 10 is turned leftward and rightward through a constant angle in cutting of the workpiece, the workpiece cutting portion located above the row of wires swings as shown in FIGS. 7B and 7C. In this swinging, the feed side pulley 34 and the retrieving side pulley 35 are structured such that the pulley on the side where the tension in the wire A decreases is controlled in the tension applying direction away from the work roller 11 and the pulley on the side where the tension in the wire A increases in swinging is controlled in the tension lessening direction by approaching the work roller 11 to thereby accommodate the tension fluctuations in the wire A occurring at the time of swinging of the row of wires.

Figure 8:
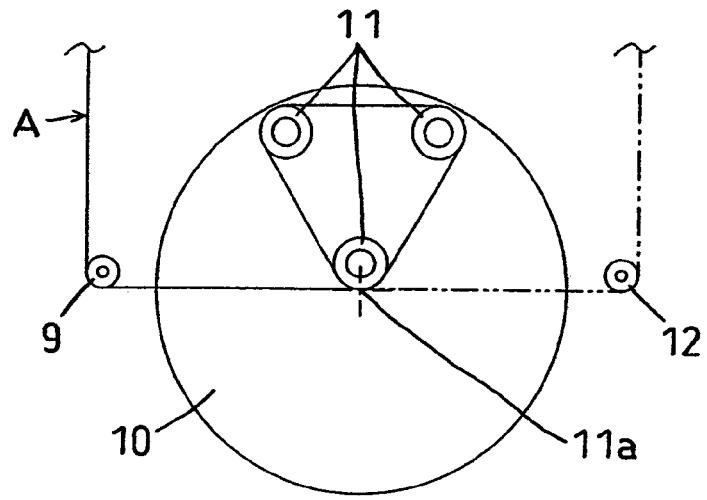
FIGS. 8A to 8C are actuation explanatory views of an essential portion and showing a wire saw of a fourth embodiment.
Figure 8:
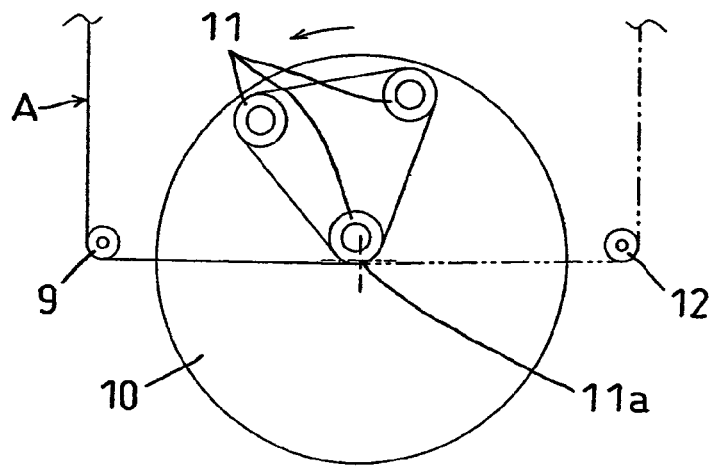
Figure 8:
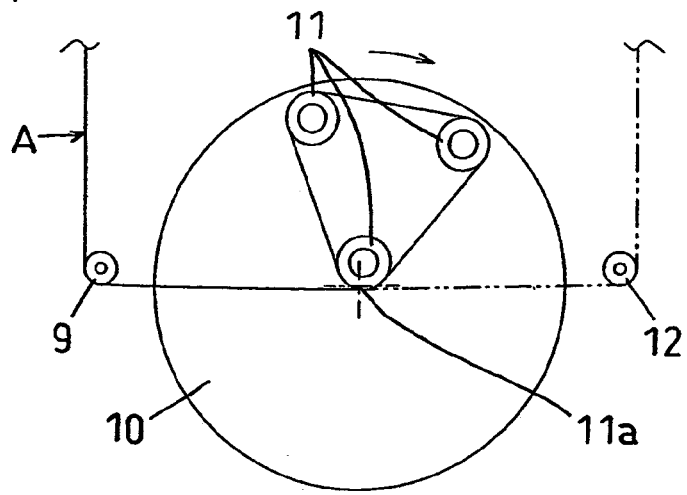

FIGS. 8A to 8C show a fourth embodiment of the invention. Three work rollers 11 are disposed on the swinging disk 10 so that a wire contact point 11a of one of the work rollers 11 is aligned with an axial center of rotation of the swinging disk 10, the wire going into and out of the work roller 11. As shown in FIG. 8A, feed side wire $A_1$ goes from a guide pulley 9 into the work roller 11 located in a lower position and retrieving side wire $A_2$ is drawn out from the work roller 11 in the lower position to a guide pulley 12 when a workpiece cutting portion located above the row of wires is horizontal.

When the swinging disk 10 is turned leftward and rightward through a constant angle in cutting of the workpiece, if the wire contact point 11a of one of the work rollers 11 which the wire A goes into and out of is aligned with the axial center of rotation of the swinging disk 10, the work rollers 11 swing about the wire contact point 11a of the work roller 11 as a fulcrum and the tension fluctuations in the wire A do not occur even when the row of wires is swung as shown in FIGS. 8B and 8C.

Although the swinging angle of the work rollers 11 is illustrated to be large in each embodiment, the actual swinging angle can be changed properly depending on material of the workpiece to be cut. Even during cutting of the workpiece, it is possible to change the swinging angle.

What is claimed is:

1. A wire saw having a row of wires formed by winding wire about a plurality of work rollers provided to a swinging disk many times, for causing the wires of the row of wires to reciprocate or travel in one direction at high velocity, for pushing a workpiece against the row of wires to cut the workpiece into a plurality of pieces, and for swinging the row of wires in cutting of the workpiece, wherein a feed side pulley located on a side of feeding of the wire to the work rollers and a retrieving side pulley located on a side of retrieving of the wire from the work rollers are provided to the swinging disk so as to swing together with the swinging disk, two outer pulleys for guiding the wire to the feed side pulley and for guiding the wire from the feed side pulley to the work rollers are fixed and disposed on an outer side of the feed side pulley, two outer pulleys for guiding the retrieved wire from the work rollers to the retrieving side pulley and for guiding the wire from the retrieving side pulley to an outside are fixed and disposed on an outer side of the retrieving side pulley, and the feed side pulley and the retrieving side pulley are located with respect to each other so that respective distances between the feed side pulley and the retrieving side pulley and the respective corresponding outer pulleys increase and decrease in directions for canceling out tension fluctuations in the wire according to the tension fluctuations in the wire due to increase and decrease of the distances between the work rollers and the outer pulleys in swinging of the swinging disk.

* * * * *